March 16, 1971     W. DORR ET AL     3,570,277
ARRANGEMENT FOR MEASURING THE TEMPERATURE OF A METAL BATH
Filed May 26, 1969     4 Sheets-Sheet 1
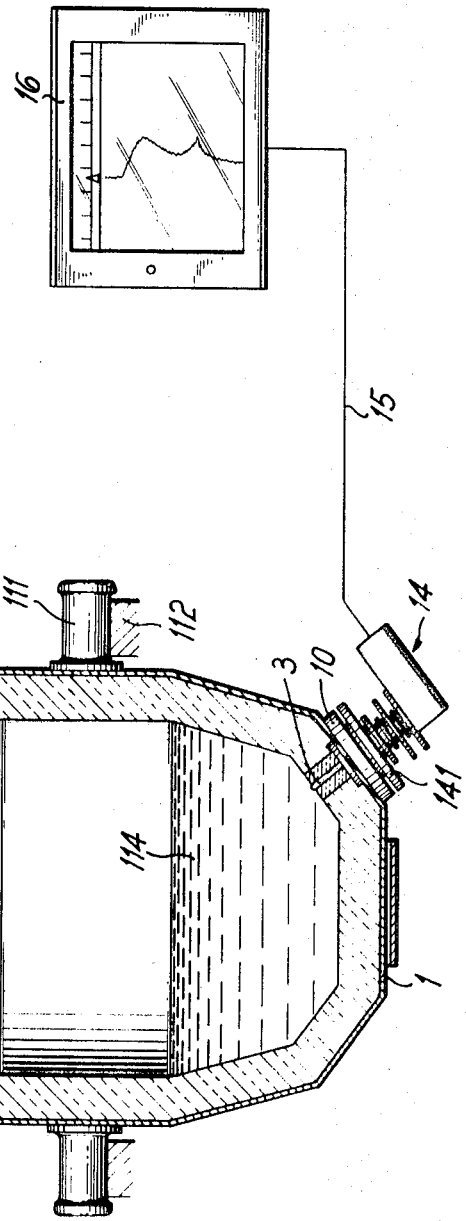
INVENTORS:
Wolfgang Dörr
Wolfgang Hecknagel
Rüdiger Scheel
By
Walter Becker

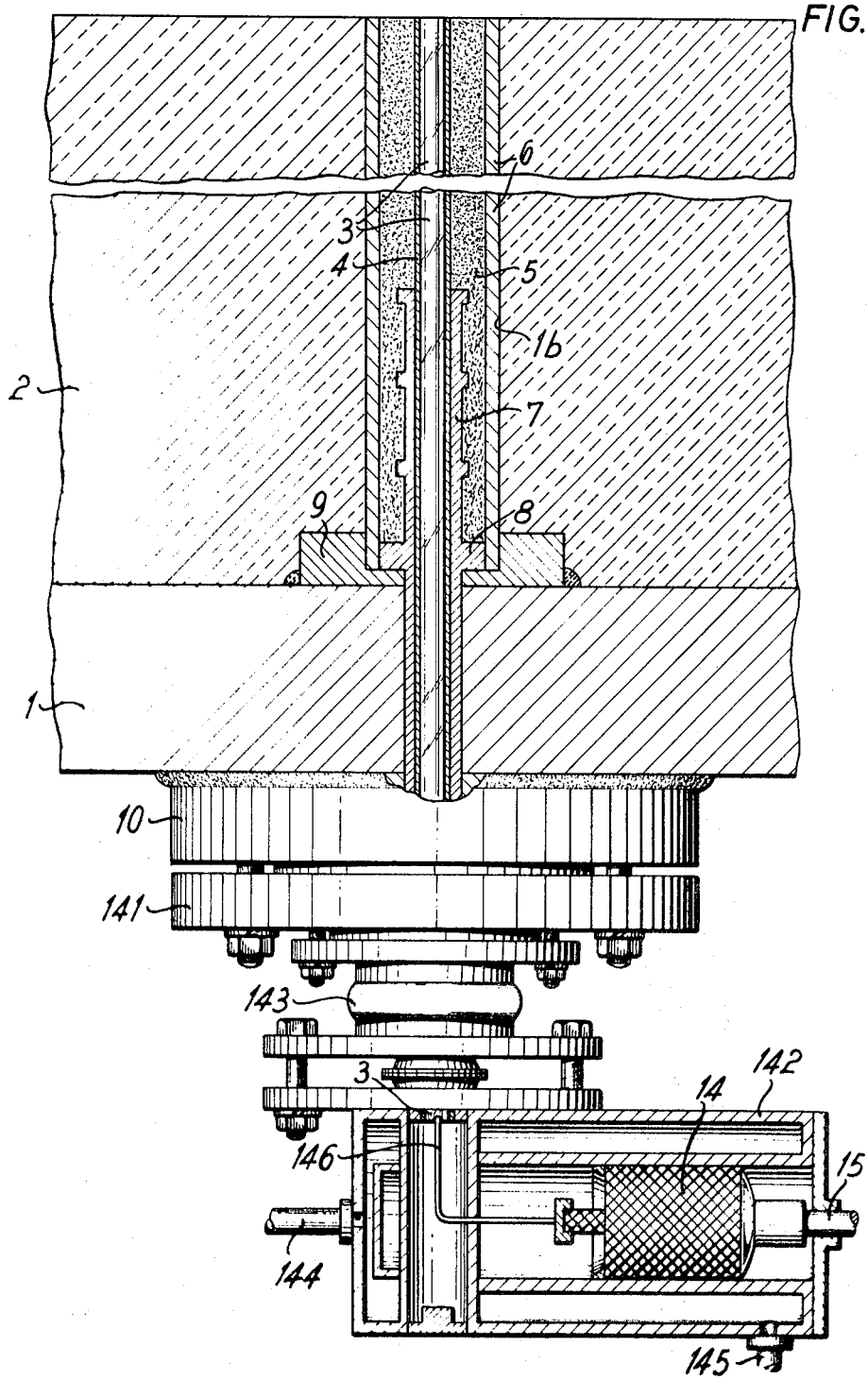

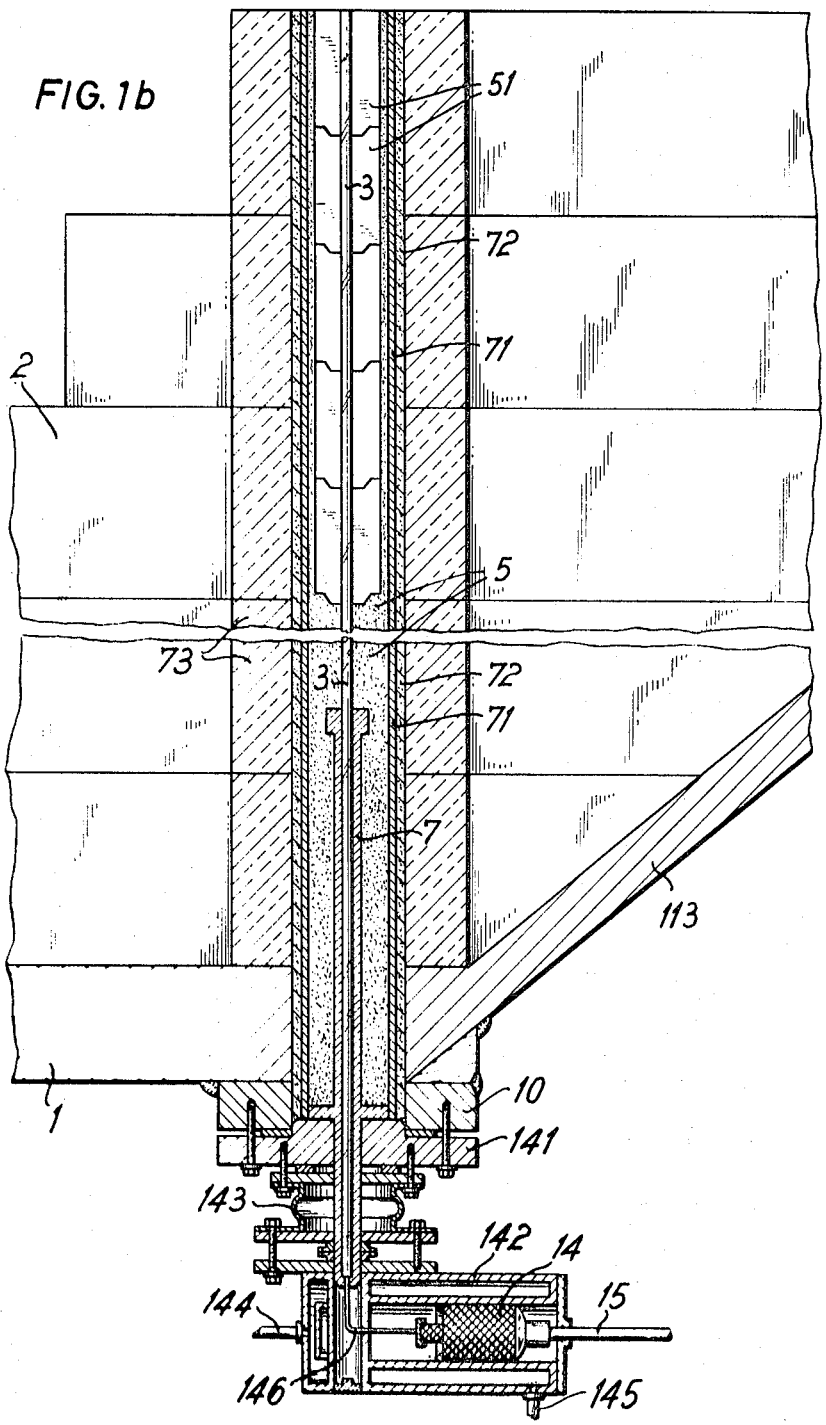

United States Patent Office 3,570,277
Patented Mar. 16, 1971

3,570,277
ARRANGEMENT FOR MEASURING THE TEMPERATURE OF A METAL BATH
Wolfgang Dorr, Essen-Stadtwald, Wolfgang Recknagel, Dortmund, and Rudiger Scheel, Ergste, Germany, assignors to Hoesch Aktiengesellschaft, Dortmund, Germany
Filed May 26, 1969, Ser. No. 827,783
Int. Cl. G01j 5/04
U.S. Cl. 73—355                                5 Claims

ABSTRACT OF THE DISCLOSURE

An arrangement for measuring in a continuous manner the temperature of a liquid metal bath, according to which a rod of light permeable high temperature and corrosion-resistant material extends through the wall of the vessel and in the interior of the vessel is embedded in a mass of alkali-free oxides with a high melting point such as zirconium oxide or zirconium silicate while at the end of said rod there is arranged a color pyrometer.

---

The present invention relates to an arrangement for measuring in a continuous manner the temperature of a liquid metal bath in a metallurgical vessel, especially a converter, while employing a rod of light permeable high temperature resistant and corrosion-resistant material.

According to an article in the German periodical Stahl und Eisen, 1962, pages 797 to 808, it is known by thermoelectric means in a continuous manner to measure the temperature of a metal bath in a converter. According to this known method, a protective pipe of a special material containing as main component chromium oxide is, through a lateral opening, introduced into the wall of the converter at the level of the metal bath or iron melt. The said protective pipe, which extends into the interior chamber of the converter, is journalled in a ceramic mass of meltable magnesia and water glass in the front portion of the opening in the converter wall. The temperature of the metal bath is measured by means of a thermo-element introduced into the protective pipe. The drawback of this known temperature measuring operation consists in that the protective pipes have lost their usefulness after an average of only three melts. Moreover, the protective pipe extending into the interior of the converter can relatively easily be damaged so that no temperature measuring operation is possible.

It is also known to carry out temperature measurements of the type involved by means of a rod of quartz glass according to which the temperature for instance of a liquid metal in a ladle is measured in such a way that the rod is for a brief period of time immersed into the melt, and the bath radiation conveyed by total reflection into said rod is measured at the other end by means of a color pyrometer. Such measuring is possible with the high temperature of the metal bath of approximately 1600° C. but only for a very short period of time because the rod of quartz glass devitrifies at its surface at a temperature in excess of 1000° C. so that the total reflection is affected and a temperature measuring over a longer period is no longer possible.

It has also been suggested to install a thermometer into a transparent protective pipe. Furthermore, it is known to provide pipes of zirconium oxide for arming thermocouples against high temperatures.

It is an object of the present invention to provide an arrangement for the measuring of temperatures which will overcome the above mentioned drawbacks and which will make possible the measuring of temperature in a continuous and simple manner over at least one converter operation or cycle.

It is a further object of this invention to provide an arrangement of the above mentioned type which will prevent rods of the above outlined type from devitrifying at temperatures exceeding 1000° C.

These and other objects and advantages of the invention will appear more clearly from the following specification in connection with the accompanying drawings, in which:

FIG. 1 illustrates an oxygen blowing converter with a measuring device according to the present invention for carrying out in a continuous manner an optical temperature measuring operation, the optical indicating device for the measured temperature also being shown.

FIG. 1a shows a color pyrometer connected to the flange of a blowing converter shown at a larger scale than that of FIG. 1.

FIG. 1b illustrates in a manner similar to FIG. 1a the lower portion of a converter with a modified temperature measuring device according to the invention.

Figure 2:
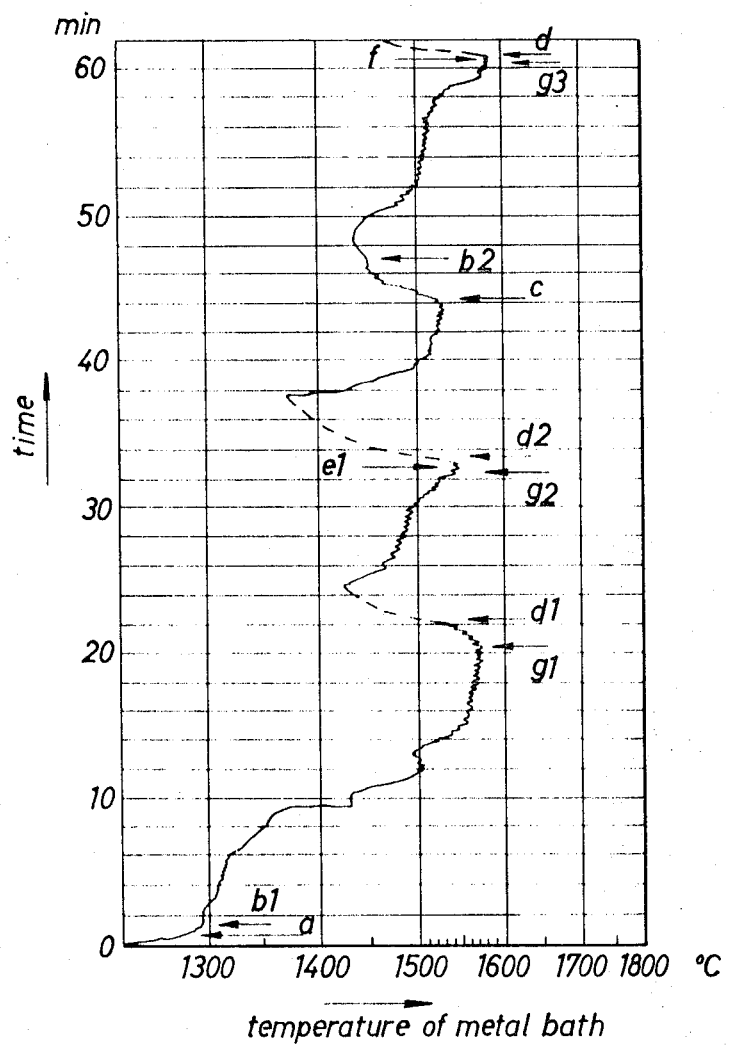
FIG. 2 illustrates a temperature curve which has been recorded by means of the arrangement according to the invention.

The above objects have been realized according to the invention by embedding the rod of light permeable high temperature and corrosion-resistant material, for instance of quartz glass, which is passed through the wall of the oven vessel, in the interior of the vessel in a mass of high temperature melting alkali-free oxides as for instance zirconium oxide or zirconium silicate, while at the end of the said rod a color pyrometer is arranged. Advantageously, the rod which extends up to the interior circumference of the lining of the vessel and on the other hand protrudes outwardly beyond the wall of the oven vessel, is arranged in a steel pipe, and the mass of high temperature melting alkali-free oxides is surrounded by a pipe which consists of a material selected in conformity with the lining of the vessel. If the vessel of the converter consists of basic materials such as dolomite, the pipe will be produced likewise of basic material for instance magnesium oxide, whereas if the lining consists of a fire-resistant acidic material, the pipe will be made of acidic fire-resistant material. Advantageously, the rod and the steel pipe are surrounded by a protective pipe and extend from the interior of the vessel through the bottom of the vessel toward the outside.

According to a further development of the arrangement according to the invention, the bottom of the vessel has its outside at the face wall provided with a flange for connection with the color pyrometer.

Referring now to the drawings in detail, FIG. 1 illustrates an oxygen blowing converter 11 journalled in bearings 112 by means of its trunnions 111. The converter mantle or housing 113, preferably made of sheet metal steel, has an inner lining 2 of fire-resitant material such as bricks of tar dolomite. Into the converter section where the converter bottom 1 merges with the lateral converter wall, there is built in the temperature measuring arrangement according to the invention together with a rod 3 of quartz glass having connected thereto a color pyrometer generally designated 14. The pyrometer 14 has connected thereto an electric conductor 15 leading to an optical indicating device 16 to which the results of the measured temperature of the metal bath 114 are conveyed through conductor 15. This measured temperature is by said device 16 registered so as to show the chronological course of the temperature of a melt.

FIG. 1a shows in greater detail the lower right hand portion of the converter 11 of FIG. 1. As will be seen from FIG. 1a, the bottom 1 of the converter 11 has a passage forming means of axially aligned opening portions $1a$, $1b$ one of which extends through the bottom 1 and the other of which extends through the lining formed by fire-resistant bricks 2 and extends into the interior of the converter. The diameter of said passage $1b$ within the brick lining 2 is greater than the diameter of the passage $1a$ in the bottom 1. For purposes of measuring in a continuous manner, the temperature of the metallic melt to be blown with oxygen, a rod 3 of quartz glass is arranged within the said opening portions $1a$, $1b$. This rod 3 extends on one hand to the interior circumference of the fire-resistant lining and on the other hand extends beyond the bottom 1 which consists of steel sheet metal. The rod 3 of quartz glass which is arranged in a steel metal pipe 4 is embedded in a mass 5 of zirconium oxide or zirconium silicate. This mass is held together by a pipe 6 of a fire-resistant mass, especially magnesium oxide.

At its lower end, the pipe 6 is closed by a ring member 8 which is connected to the protective pipe 7 in a closing manner. The protective pipe 7 together with the rod 3 and the pipe 4 extends through the bottom 1 of the converter. For purposes of better holding the pipe system, the arrangement within the pipe 6 is inserted into a bottom plate 9 which on its inner side is welded to the bottom 1 of the converter. The outside of the bottom 1 of the converter has welded thereto a flange 10 to which the above mentioned color pyrometer 14 (FIG. 1a) is connected which is shown in greater detail in FIG. 1a. More specifically, this connection is such that the light entrance opening will be located opposite the end of the rod 3 of quartz glass. The color pyrometer is protected against mechanical damage and heat radiation in a well-known manner. Thus, the color pyrometer 14 is connected in a cooling container 142 to the flange 10 by means of a flange 141.

For purposes of protecting the rod 3, a bellows 143 is provided between the flange 141 and the cooling container 142, said bellows forming an expansion compensator. The cooling liquid passes through pipe connection 144 into the cooling container 142 and leaves the latter through pipe connection 145. Connected to the end of rod 3 is a glass fiber conduit 146 through which the measured bath temperature valve is conveyed into the color pyrometer.

With the modification illustrated in FIG. 1b, the arrangement according to the invention for measuring the temperature of the metal bath 114 is in a particularly advantageous manner mounted at the edge area of the bottom 1 of the converter, and more specifically where the bottom 1 merges with the converter mantle 113. The arrangement is such that the rod 3 of quartz glass together with the protective pipe 7 and the mass 5 of zirconium oxide or zirconium silicate and a further protective pipe 71 as well as a tamped mass 72, e.g. of tar dolomite, is passed through the bottom 1 of the converter to the outside thereof. In that upper portion of the arrangement according to invention which faces the interior of the converter, rod 3 of quartz glass is surrounded by bricks 51 whereas in the lower portion of said arrangement rod 3 is surrounded by the mass 5 of zirconium oxide or zirconium silicate. Generally, the measuring system is inserted into one or more bricks 73 adjacent to the lining of fire-resistant bricks 2.

FIG. 2 shows a diagram having plotted over the abscissa the temperature of a metal bath and having plotted over the ordinate the time. Thus, the curve shown in FIG. 2 represents the temperature of a metal bath over the time course of a melt in an oxygen-blowing converter as measured with an arrangement according to the invention.

After the phosphorus-rich raw iron has been filled into the converter at a temperature of approximately 1300° C. (Point $a$), starting at $b_1$, oxygen with a pulverous lime is blown onto the metal bath. The temperature will then up to the 20th blowing minute increase continuously to approximately 1570° C. The temperature measured with a gauged dip element for purposes of comparison, likewise indicates a temperature of 1570° C. After the oxygen supply has been turned off, the converter is tilted for withdrawing a sample (see Point $d_1$) and thereafter is again righted whereupon the blowing with oxygen is continued. The metal bath temperature, which dropped or decreased during the tilting of the converter, increases up to the end $e_1$ of the first blowing period to approximately 1555° C. The temperature ($g_1$) measured for comparison again with the dip element indicates a temperature of 1560° C. For purposes of drawing off slag and for withdrawing a sample, the converter is again tilted ($d_2$). After withdrawal of the slag, scrap is added to the metal bath for purposes of cooling ($c$) and the supply of oxygen is at the start of the second blowing period again started ($b_2$) 52.5 minutes after the start of the blowing period. As the course of the curve will indicate, the temperature of the metal bath increases up to the end ($f$) of the second blowing period in the approximately 60th minute of the blowing period to approximately 1595° C. The comparative measuring ($g_3$) by means of the dip element at the same time shows a temperature of 1610° C., so that in all instances the temperature measurement effected by the arrangement according to the present invention is approximately the same as that obtained with the dip element.

As will be evident from the above, the advantages of the arrangement according to the present invention consists primarily in that a devitrification of the rod consisting of light permeable high temperature and corrosion-resistant material will be prevented and thus a continuous temperature measuring of the metal bath, especially with the oxygen blowing metal employed in converters, will be possible in a simple manner over at least one converter operation or cycle.

It is, of course, to be understood that the present invention is, by no means, limited to the particular showing in the drawings, but also comprises any modifications within the scope of the appended claims.

We claim:

1. An arrangement readily interchangeable in combination for measuring in a continuous manner the temperature of a liquid metal bath which includes: a metallurgical vessel adapted to receive the liquid metal bath the temperature of which is to be measured, said vessel having capability to permit passage therethrough of a mass of alkali-free oxides with a high melting point, a rod of light permeable high-temperature and corrosion-resistant material extending into said vessel and being embedded in said mass, a pyrometer arranged at the end of said rod, a tube of steel sheet metal surrounding said rod and having the same arranged therein, and pipe means of fire-resistant material and surrounding said tube in radially spaced relationship thereto so as to define therewith a chamber of annular cross section, said chamber being filled with said mass of alkali-free oxides with a high melting point.

2. An arrangement in combination according to claim 1, in which said vessel has its interior provided with a fire-resistant lining, and in which said pipe means is of a material corresponding to said lining.

3. An arrangement in combination according to claim 1, in which said pipe means is of magnesium oxide.

4. An arrangement in combination according to claim 1, in which said vessel has a bottom with a passage leading to the outside of said vessel, and in which there is provided a protective pipe surrounding at least a portion of said rod and said tube of steel sheet metal, said protective pipe extending from the interior of said vessel through the bottom thereof to the outside.

5. An arrangement in combination according to claim 1, in which said vessel has a bottom, and in which the outside of said bottom is provided with flange means externally for connecting the pyrometer.

References Cited
UNITED STATES PATENTS

| | | | | |
|---|---|---|---|---|
| 1,323,309 | 12/1919 | Northrup | | 356—44 |
| 1,894,109 | 1/1933 | Marcellus | | 73—355 |
| 2,709,367 | 5/1955 | Bohnet | | 73—355 |
| 3,051,035 | 8/1962 | Root | | 73—355X |
| 3,345,873 | 10/1967 | Lellep | | 73—351 |
| 3,379,062 | 4/1968 | Lellep | | 737—351 |

LOUIS R. PRINCE, Primary Examiner

FREDERICK SHOON, Assistant Examiner

U.S. Cl. X.R.

356—44